Jan. 4, 1927.

R. S. TROTT 1,613,065

STEERING DRIVE WHEEL

Filed July 21, 1924   5 Sheets-Sheet 1

INVENTOR,
Rolland S. Trott

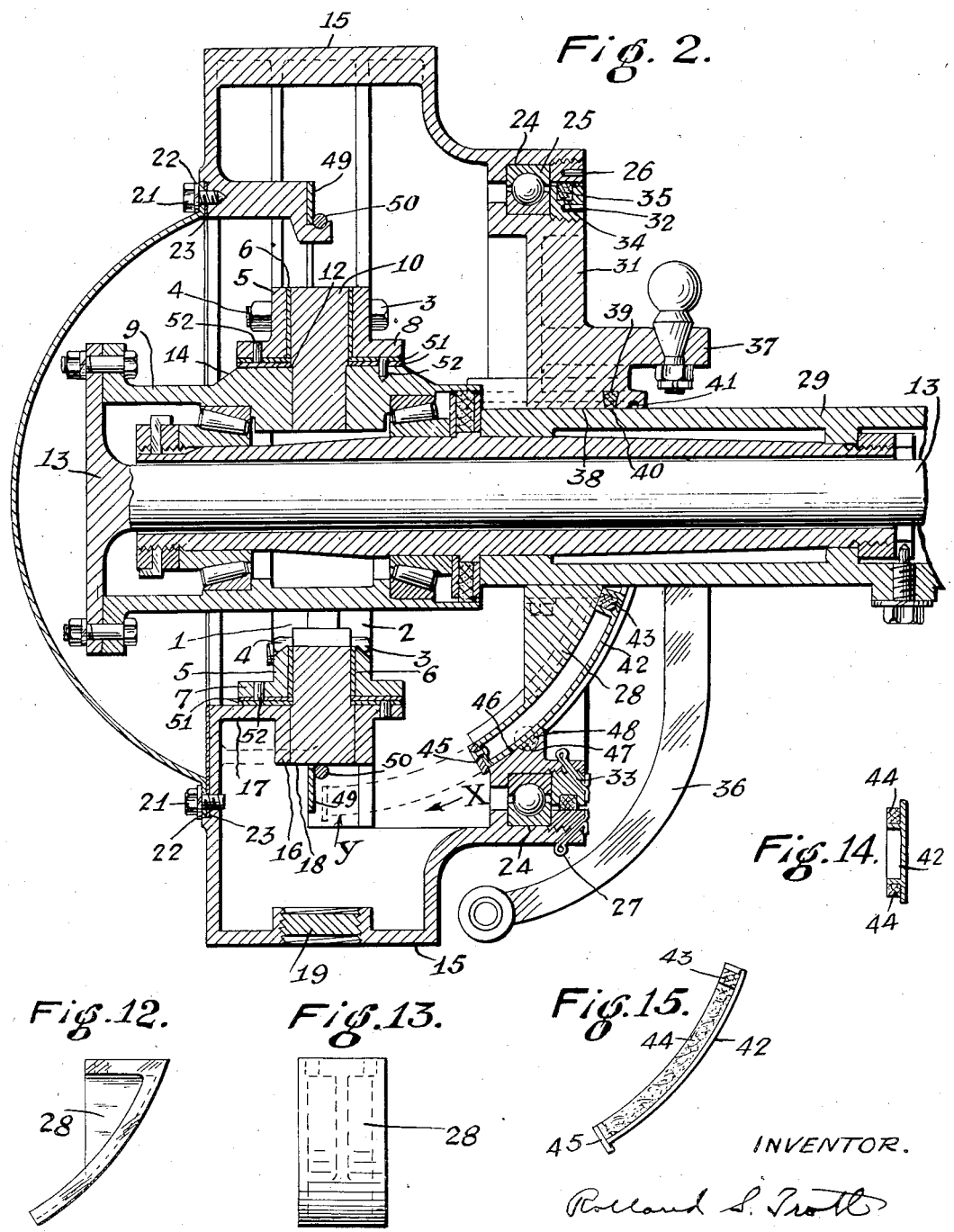

Jan. 4, 1927.

R. S. TROTT 1,613,065

STEERING DRIVE WHEEL

Filed July 21, 1924     5 Sheets-Sheet

INVENTOR
Rolland S. Trott

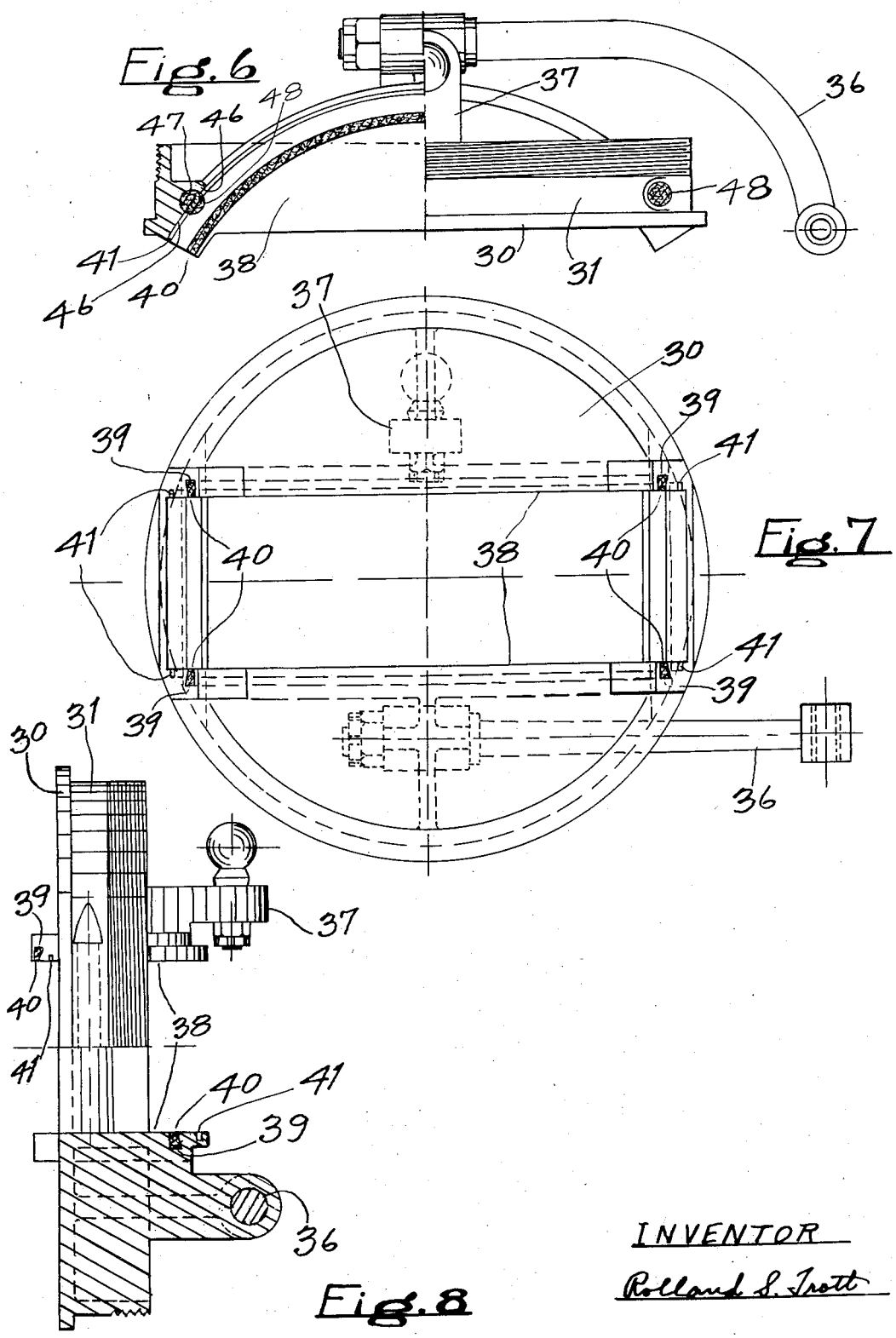

Jan. 4, 1927.

R. S. TROTT 1,613,065

STEERING DRIVE WHEEL

Filed July 21, 1924    5 Sheets-Sheet 5

Inventor
Rolland S. Trott

Patented Jan. 4, 1927.

1,613,065

UNITED STATES PATENT OFFICE.

ROLLAND S. TROTT, OF DENVER, COLORADO.

STEERING DRIVE WHEEL.

Application filed July 21, 1924. Serial No. 727,217.

My invention relates to steering drive wheels such as may be used for the front wheels of four wheel drive automobiles, trucks, tractors, and the like, and its object is to provide a steering drive wheel that may be used with various standard types of power axles, and in which the tractive effort will have no effect whatever upon the steering action.

A further object is to provide a steering drive wheel of cheap and simple construction, which may be lubricated by the splash system of lubrication such as is ordinarily used in the differential housings of power axles.

A further object is to provide a steering drive wheel, which, because of its design, may provide ample turning angle and may be made so rugged that it will easily withstand the strains caused by the enormous gear ratios and engine power used in even the most powerful four wheel drive vehicles.

My invention consists of a wheel whose center may be mounted upon well known types of power axles, and which permits steering action by a guided universal connection between the center and the wheel rim, as will appear below.

In the drawings, Figure 1 is an elevation and partial vertical section of my wheel when mounted upon what is known as a full floating axle.

Figure 2 is a section on the line A—B—C of Figure 1.

Figures 3, 4, and 5 are three views of the universal ring.

Figures 6, 7, and 8 are three views of the alignment guide.

And Figures 9, 10, and 11 are three views of the center of my wheel when it is adapted to be mounted upon what is called a semi-floating axle.

Figures 12 and 13 are two views of the guide plate.

Figure 14 is a section and Figure 15 is a top view of the packing segment.

Figure 16 is a fragmentary section similar to the lower half of Figure 2, but showing the positions of the guide and the packing segments in relation to the axle housing when the wheel is turned in steering to the limiting position.

Figure 1:
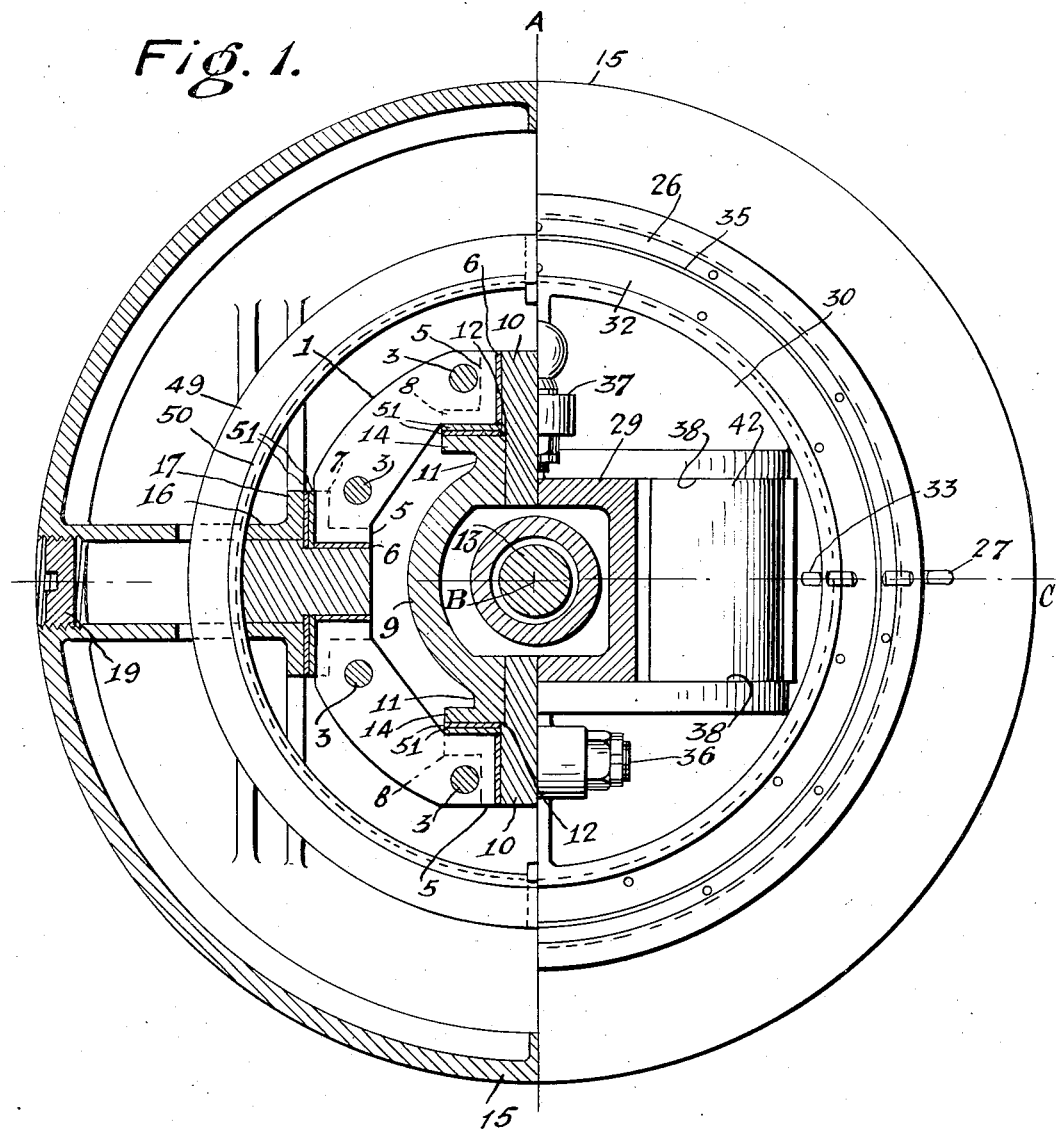

The universal ring is made in two parts, 1 and 2, which are securely bolted together to form one piece by the bolts 3 and nuts 4, which are located on each side of the four bosses 5.

The bosses 5 are bored radially and bushed by the bushings 6, to form four bearings evenly spaced about the ring and all in the same plane.

Two opposite bosses are provided with the outward facing thrust flanges 7, the other two bosses being provided with the inward facing thrust flanges 8.

Figure 9:
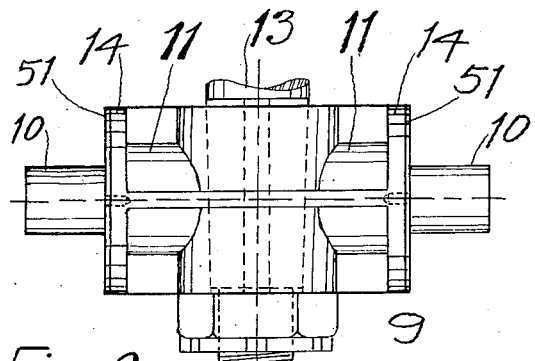
Figure 11:
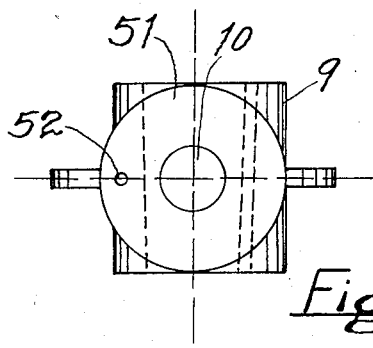
Figure 10:
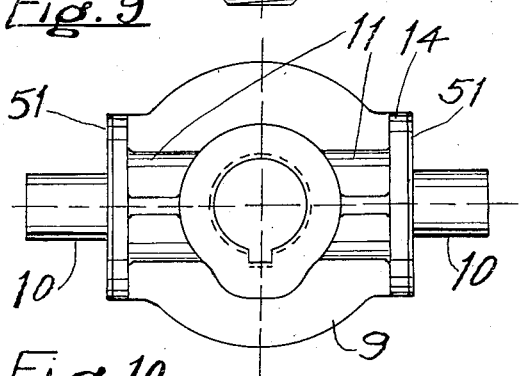
Figure 3:
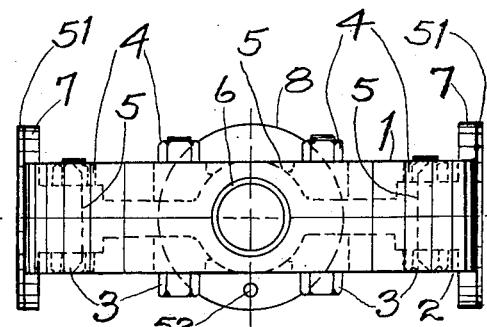
Figure 5:
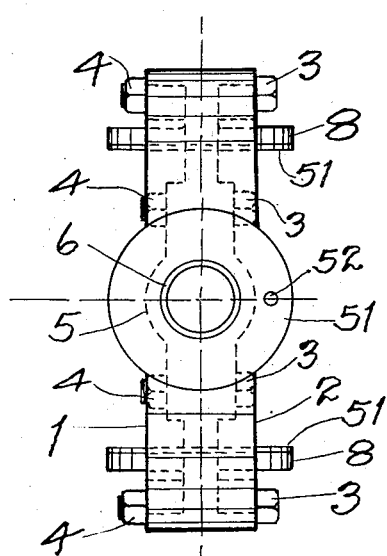
Figure 4:
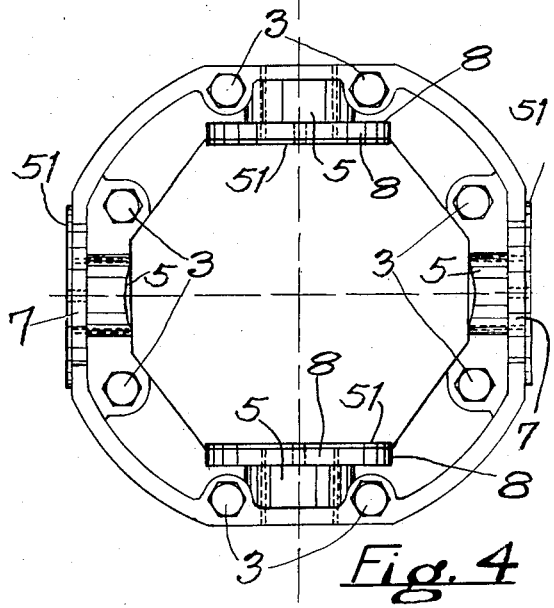
Figure 1B:
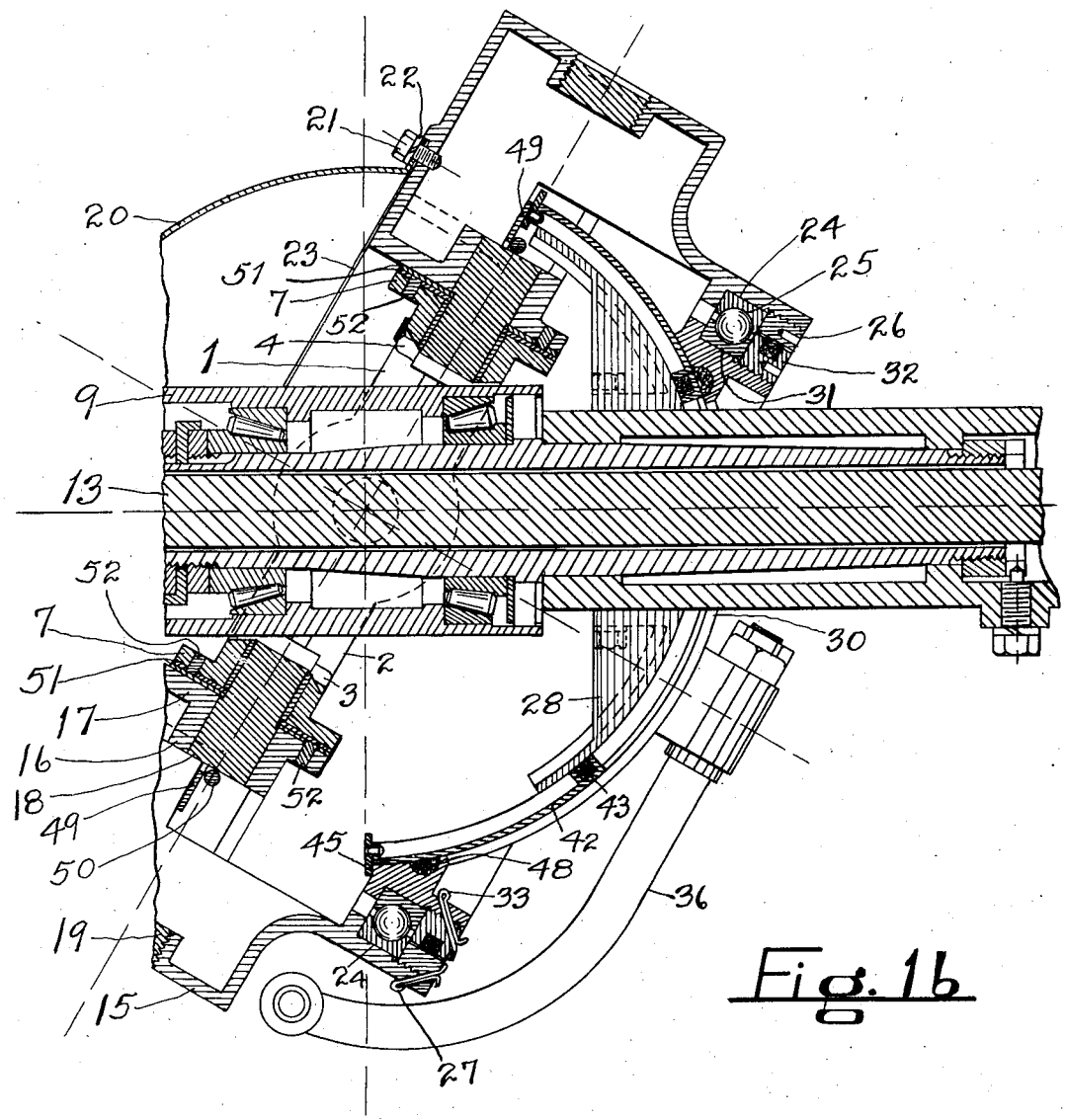

The center 9 may be mounted upon a full floating axle as may be seen in Figure 2, or upon a semi-floating axle by a construction such as seen in Figures 9, 10, and 11. But anyone versed in the automotive arts will readily perceive that the center 9 may be mounted upon any other type of power axle by a construction similar to that of the wheel normally used, and by such other slight adaptations as are necessary.

The center 9 is provided with two diametrically opposite universal pins 10, pressed tightly to the shoulder 12 in the bores of the bosses 11.

These universal pins may, if desired, be made integral with the center 9, but I prefer the construction shown because of its various advantages.

The center 9 is directly attached to the drive axle 13, as shown in Figure 2, or it may be mounted directly upon it as shown in Figure 9, or attached to or driven by the drive axle directly or indirectly as may be required by the particular type of axle upon which the center is designed to be mounted. The essential point, in any case, is that the center 9 should be mounted to support the power axle and to be revolved by it.

The bosses 11 are provided with the thrust flanges 14.

The rim 15 is provided with the bosses 16 and the thrust flanges 17. The universal pins 18 are tightly pressed into the bores in the bosses 16 made to receive them; the holes in the rim made for this purpose being then filled by the plugs 19 to prevent oil leakage.

A thrust washer, 51, bears against each thrust flange of the universal ring, the center and the rim and is held from revolving with respect to its flange by the dowel pin 52.

As the wheel revolves the weight is taken alternately by the universal pins and by the thrust washers, but the torque of the applied power is at all times taken by the universal pins.

Hardened steel pins, bushings, and thrust washers, all of ample size and in a splash of lubricant will assure my wheel a long life.

The cover, 20, is securely attached to the rim 15, by screws 21, and lock washers 22, the joint being made oil tight by the gasket 23.

The rim 15, is provided with a shouldered bore 24, to receive the outer race of the alignment bearing 25, the outer end of the bore 24, being threaded to receive the threaded nut 26, which is locked in place by the cotter pin 27, or in any other proper manner.

The guide plates 28, are bolted to the axle housing 29, or are attached in any other proper manner to the axle housing. The outer faces of the guide plates 28, are in the form of the arc of a circle whose center lies at the point of intersection of the axes of the four universal pins.

The top and bottom of the guide plates are flush with the top and bottom of the axle housing 29, the three combining to form flat top and bottom faces.

The alignment guide 30, is provided with a shouldered, cylindrical surface 31 to receive the inner race of the alignment bearing 25, the outer end of the surface 31 being threaded to receive the threaded nut 32, which is locked in place by the cotter pin 33, or in any other proper manner.

The nut 32 is provided with a groove 34 in its outer face for the packing 35, which bears against the inner face of the nut 26, forming a packing to prevent oil leakage from the interior of the wheel.

The alignment guide 30 is provided with the tie rod arm 36, and the drag link arm 37.

The alignment guide is also provided with a slot through which the axle housing 29 passes, the guide faces 38 of the alignment guide being guided by the flat top and bottom faces formed by the axle housing 29 and the two guide plates 28. The guide faces 38 are provided with arc-shaped grooves 39 for the packings 40, which bear against the flat top and bottom faces formed by the axle housing 29 and the two guide plates 28, to prevent oil leakage.

The guide faces 38 are also provided with arc-shaped slots 41, in which are guided the packing segments 42, which are provided with the vertical packings 43 and with the horizontal packings 44, and with the end plates 45.

The vertical packings 43 bear against the arc faces of the guide plates 28, and the horizontal packings 44 bear against the guide faces 38.

The alignment guide 30 is also provided with the arc faces 46 in which are the grooves 47, for the packings 48. These packings 48, bear against the outer arc shaped faces of the packing segments 42. It will now be seen that the function of the alignment guide 30 is to maintain the wheel in a vertical position, while at the same time permitting it to swing relative to the axle to steer the vehicle.

The connection between the alignment guide 30 and the rim 15 is maintained as the wheel revolves by the large ball bearing as described above. The alignment guide maintains the wheel in an upright position because of the close fit of the slot faces 38 of the guide 30 against the top and bottom faces of the axle housing 29. The length of the slot through the guide 30 permits the axle housing 29 to move through the guide slot, as the guide swings about the center of the wheel in the steering movement.

The rim 15 is provided with the bumper ring 49, held in place by the snap ring 50, or in any other proper manner.

It will now be seen that my steering drive wheel is in effect a large universal joint, the driving member of which is the center 9, and the driven member of which is the rim 15.

This universal joint not only transmits the power of the drive which revolves the wheel, but also acts as the spokes of the wheel to carry the load and to maintain the center line of the power axle in the center of the rim at all times.

This universal joint of itself is in unstable equilibrium, except for the width of the tire on a level road. In other words there is nothing in this large universal joint which would keep the rim vertical against side thrusts of ruts, hillsides, and curves.

The alignment guide 30, however, guided as it is on the axle housing 29, allows this large universal joint to pivot the rim only upon a vertical axis, thus giving stability to the construction through the connection furnished by the alignment bearing 25.

In this pivotal steering action the alignment guide 30 will swing horizontally about a vertical axis which passes through the intersection of the axes of the universal pins.

As this movement takes place as indicated in Figure 2 by the arrow "x", the packing segment 42, moved by contact of the alignment guide 30 with the end plate 45, will reach a limiting position "y", indicated by the dotted lines.

This is more clearly shown in Figure 16, which shows the two limiting positions of the segments 42.

On the return movement, the bumper ring 49 by contact with the end plate 45 will move the packing segment 42 back toward its former position.

This construction and the other packings mentioned may provide a reasonably oil-tight wheel with a turning angle of 30° in a power axle whose housing is at least six inches square; that is, a commercial five ton truck axle, or more.

The universal pins are to be provided with the usual oil grooves, but of rather liberal dimensions, so that proper lubrication will take place when the wheel is filled with a heavy oil or grease that will not leak easily.

The rims shown are adapted to receive solid rubber tires, but may just as well be made to receive pneumatic tires if desired.

It is understood that by finishing the flat top and bottom faces of the axle housing 29 and the two guide plates 28 slightly out of square, the top of the two wheels of the axle may be made slightly farther apart than their tread on the road.

Also, by making these top and bottom faces not quite horizontal the axis about which the wheel turns in steering may be tilted forward at the bottom so as to give the caster action for steering.

But these variations are small and will be understood by anyone versed in the art, so in the description they were omitted for the sake of simplicity and the imaginary steering axis was spoken of as being vertical.

I am well aware that there are various modifications of construction that might be used not only in the universal mechanism, but also in the oil packing devices, but I consider that these amount to nothing more than mechanical equivalents and that they do not depart from the essence of my invention.

Therefore, what I claim as new, and desire to protect by Letters Patent, is as follows:—

1. In combination, a power axle, a wheel hub mounted thereon and adapted to be revolved thereby, a wheel rim adapted to receive a tire, means forming a universal connection between said rim and said hub, an alignment guide guided upon the said power axle and means connecting the guide and the rim and adapted to permit the revolution of the rim and to control the angular relation of the rim to the said power axle in steering and to maintain the wheel in a substantially upright position.

2. In a steering drive wheel, a wheel hub, a wheel rim adapted to receive a tire, means forming a universal connection between said rim and said hub of said wheel, an axle adapted to support and revolve said hub, an alignment guide provided with means for steering control and guided upon said axle, and means connecting the alignment guide to the rim and permitting the revolution of the rim.

3. In combination, a power axle, a bearing, an alignment guide guided upon the power axle and provided with means for steering control and with means mounting one element of said bearing, a wheel rim adapted to receive a tire and provided with means mounting another element of the said bearing, a wheel hub mounted upon said power axle and adapted to be revolved thereby and means forming a universal connection between the said rim and the said hub.

4. In combination, a power axle, a center mounted thereon and adapted to be revolved thereby, a bearing, a rim adapted to receive a tire and one element of the said bearing, a guide mounted on said power axle and guided thereby to move with respect to the axle in a substantially horizontal plane and mounting the other element of said bearing and provided with means for steering control, and a ring mounted at two points on the rim and at two points on the center, the four points being equally spaced about the ring, and providing pivotal movement.

5. In combination, a power axle, a center mounted thereon and adapted to be revolved thereby, a bearing, a rim provided with a cover and adapted to receive a tire and one element of the said bearing, a guide mounted on said power axle and guided thereby to move with respect to the axle in a substantially horizontal plane and mounting the other element of the said bearing and provided with means for steering control, a ring mounted pivotally at two points on the rim and at two points on the center, the four points being equally spaced about the ring, and means adapted to prevent leakage of lubrication between the power axle and the guide, and between the guide and the rim.

6. In a steering drive wheel, a power axle, a center mounted thereon and adapted to be revolved thereby and provided with two diametrically opposite pins and with thrust faces concentric therewith, a bearing, a rim adapted to receive a tire and one element of the said bearing, and with two diametrically opposite pins and with thrust faces concentric therewith, a guide mounted on the power axle and guided thereby to move with respect to the axle in a substantially horizontal plane and mounting the other element of the said bearing and provided with means for steering control, and a ring provided with four journals and thrust faces concentric therewith and adapted to receive the pins and bear against the thrust faces of the rim and center, the four journals of the ring being evenly spaced.

7. In a steering drive wheel, a power axle, a center mounted thereon and adapted to be revolved thereby and provided with two diametrically opposite pins and with thrust faces concentric therewith, a bearing, a rim provided with a cover and adapted to receive a tire and one element of the said bearing, and with two diametrically opposite pins and with thrust faces concentric therewith, a guide mounted on the power axle and guided thereby to move with respect to the axle in a substantially horizontal plane and mounting the other element of the said bearing and provided with means for steering control, a ring provided with four journals and thrust faces concentric therewith and adapted to receive the pins and bear against the thrust faces of the rim and the center, the four journals of the ring being evenly spaced, and means adapted to prevent leakage of lubrication between the power axle and the guide and between the guide and the rim.

8. In a steering drive wheel, a power axle, a wheel hub mounted thereon and adapted to be revolved thereby, a wheel rim, a guide mounted on the power axle and guided thereby to move with respect to the said axle in a substantially horizontal plane and provided with means for steering control, means forming a universal connection between the said rim and the said hub of the said wheel, and means connecting the said rim and the said guide and adapted to permit the revolution of the rim and to control the angular position of the rim with respect to the axle by the position of the said guide.

9. In a steering drive wheel, a power axle, a wheel hub mounted thereon and adapted to be revolved thereby, a wheel rim provided with a cover, a guide mounted on the power axle and guided to move with respect to the axle in a substantially horizontal plane and provided with means for steering control, means forming a universal connection between the hub and the rim of the said wheel, means adapted to permit the revolution of the rim and to control the angular position of the rim with respect to the said power axle and including said guide, and means adapted to prevent leakage of lubricant between the power axle and the guide, and between the guide and the rim.

10. In combination, a power axle, a wheel hub mounted thereon and adapted to be revolved thereby, a bearing, a wheel rim adapted to receive a tire and to mount one element of the said bearing, a guide mounted on said power axle and guided thereby to move with respect to the axle in a substantially horizontal plane and mounting another element of said bearing and provided with means for steering control, and a ring pivotally mounted on said rim and said hub, the pivot points being four in number and equally spaced about the said ring and all in the same plane.

11. In combination, a power axle, a wheel hub mounted thereon and adapted to be revolved thereby, a bearing, a wheel provided with a cover and adapted to mount one element of the said bearing, a guide mounted on said power axle and guided thereby to move with respect to the axle in a substantially horizontal plane and mounting another element of the said bearing and provided with means for steering control, a ring pivotally mounted at two points on the hub and at two points on the rim, the four points being equally spaced about the ring and in the same plane, and means adapted to prevent leakage of lubricant between the power axle and the guide and between the guide and the rim.

12. In a steering drive wheel, a power axle, a wheel hub mounted thereon and adapted to be revolved thereby and provided with two pivot elements with adjacent thrust faces, a bearing, a wheel rim provided with a cover and adapted to mount one element of the said bearing, and two pivot elements with adjacent thrust faces, a guide mounted on the power axle and guided thereby to move with respect to the axle in a substantially horizontal plane and mounting another element of the said bearing and provided with means for steering control, a ring provided with pivot elements to co-act with the elements and bear against the thrust faces of the wheel rim and the wheel hub, the said elements and thrust faces being equally spaced about the ring and in the same plane, and means adapted to prevent leakage of lubricant between the power axle and the guide, and between the guide and the rim.

13. In a steering drive wheel, a wheel hub, a wheel rim, means forming a universal connection between the rim and the hub of the said wheel, an axle adapted to support and revolve said hub, a guide mounted upon said axle and adapted for substantially horizontal movement thereon, and means connecting the guide to the rim and permitting the revolution of the rim.

14. In combination, a power axle, a wheel hub mounted thereon and revolved thereby, a wheel rim, means forming a universal connection between the rim and the hub of said wheel, a guide guided upon the said axle for substantially horizontal movement thereon, and means connecting the guide and the rim and adapted to permit the revolution of the rim and to control the angular relation of the rim to the said power axle in steering and to maintain the wheel in a substantially upright position.

15. In combination, a power axle, a bearing, a guide guided upon the power axle for substantially horizontal movement and provided with means for steering control and with means mounting one element of said bearing, a wheel rim provided with means mounting another element of said bearing, a wheel hub mounted upon said power axle and adapted to be revolved thereby, and means forming a universal connection between the rim and the hub of said wheel.

In testimony whereof I affix my signature.

ROLLAND S. TROTT.